(12) United States Patent
Fujisawa

(10) Patent No.: US 11,829,941 B2
(45) Date of Patent: Nov. 28, 2023

(54) PURCHASED PRODUCT PICKUP SYSTEM

(71) Applicants: Kazunori Fujisawa, Tokyo (JP); Yodobashi Camera Co., Ltd., Tokyo (JP)

(72) Inventor: Kazunori Fujisawa, Tokyo (JP)

(73) Assignees: Kazunori Fujisawa, Tokyo (JP); YODOBASHI CAMERA CO., LTD., Tokyo (JP)

( * ) Notice: Subject to any disclaimer, the term of this patent is extended or adjusted under 35 U.S.C. 154(b) by 0 days.

(21) Appl. No.: 16/863,872

(22) Filed: Apr. 30, 2020

(65) Prior Publication Data

US 2020/0258041 A1    Aug. 13, 2020

Related U.S. Application Data

(63) Continuation of application No. PCT/JP2017/042217, filed on Nov. 24, 2017.

(30) Foreign Application Priority Data

Nov. 1, 2017    (JP) .................................. 2017-211953

(51) Int. Cl.
G06Q 10/08        (2023.01)
G06Q 30/06        (2023.01)
(Continued)

(52) U.S. Cl.
CPC ..... G06Q 10/0836 (2013.01); G06Q 30/0635 (2013.01); G07C 9/27 (2020.01);
(Continued)

(58) Field of Classification Search
CPC ........... G06Q 10/0836; G06Q 30/0635; G06Q 10/08; G07C 9/38
(Continued)

(56) References Cited

U.S. PATENT DOCUMENTS 4,583,083 A    4/1986    Bogasky
5,013,896 A    5/1991    Ono et al.
(Continued)

FOREIGN PATENT DOCUMENTS

AU    2017100350 A4    6/2017
CN      104952157 A    9/2015
(Continued)

OTHER PUBLICATIONS iXtenso; "Unmanned stores: what local supply might look like in the future"; https://ixtenso.com/technology/unmanned-stores-what-local-supply-might-look-like-in-the-future.html; Feb. 8, 2017. (Year: 2017).*

(Continued)

*Primary Examiner* — Dione N. Simpson
(74) *Attorney, Agent, or Firm* — Muncy, Geissler, Olds & Lowe, P.C.

(57) ABSTRACT

A purchased product pickup system includes a management server that communicates with a terminal of a customer and manages pickup of a purchased product by the customer in a pickup area provided in or outside a store, the pickup area is provided with a management gate for managing entrance to and exit from the pickup area and a storage shelf for temporarily storing the purchased product, and the management server allocates the storage shelf for storing the purchased product when the purchased product is ordered from the terminal of the customer, and notifies the terminal of the customer of the allocated storage shelf and an entrance code for passing through the management gate of the pickup area.

14 Claims, 10 Drawing Sheets

(51) Int. Cl.
*G06Q 10/0836* (2023.01)
*G07C 9/38* (2020.01)
*G06Q 30/0601* (2023.01)
*G07C 9/27* (2020.01)
*G07C 9/28* (2020.01)
*G07C 9/00* (2020.01)

(52) U.S. Cl.
CPC .......... *G07C 9/28* (2020.01); *G07C 9/38* (2020.01); *G07C 2009/0092* (2013.01)

(58) Field of Classification Search
USPC ........................................................ 705/339
See application file for complete search history.

(56) References Cited

U.S. PATENT DOCUMENTS

| | | | |
|---|---|---|---|
| 9,049,306 B1 * | 6/2015 | Gueorguieva | H04M 11/025 |
| 10,496,951 B1 * | 12/2019 | Kandukuri | G06Q 30/0635 |
| 2015/0356664 A1 | 12/2015 | Mackler | |
| 2016/0314517 A1 * | 10/2016 | Ogilvy | G06Q 30/0637 |
| 2017/0301004 A1 * | 10/2017 | Chirnomas | G07F 11/26 |
| 2017/0330144 A1 * | 11/2017 | Wakim | H04W 4/023 |
| 2018/0232595 A1 * | 8/2018 | Nobuoka | G06V 10/44 |
| 2019/0272581 A1 | 9/2019 | Li et al. | |

FOREIGN PATENT DOCUMENTS

| | | |
|---|---|---|
| CN | 205302441 U | 6/2016 |
| CN | 106097049 A | 11/2016 |
| CN | 106779690 A | 5/2017 |
| CN | 107103503 A | 8/2017 |
| CN | 107103710 A | 8/2017 |
| JP | H05-158957 A | 6/1993 |
| JP | 2002-342683 A | 11/2002 |
| JP | 2006-011755 A | 1/2006 |
| JP | 2010015201 A | 1/2010 |
| JP | 2011060041 A | 3/2011 |
| JP | 2012-63845 A | 3/2012 |
| JP | 2012063845 A | 3/2012 |
| JP | 2016-88676 A | 5/2016 |
| JP | 2016088676 A | 5/2016 |
| JP | 6164599 B1 | 7/2017 |

OTHER PUBLICATIONS

The extended European search report of the corresponding EP application No. 17930426.6 dated Jul. 15, 2020.
International Search Report of PCT/JP2017/042217 dated Feb. 6, 2018.
Notice of Reasons for Refusal of the corresponding JP application No. 2017-211953 dated Jan. 30, 2018.
Decision to Grant a Patent of the corresponding JP application No. 2017-211953 dated Jul. 31, 2018.
Summons to attend oral proceedings for the corresponding EP application No. 17930426.6 dated May 4, 2022.
Office Action of the corresponding CN application No. 201780096532.1 dated Mar. 28, 2023.

* cited by examiner

PURCHASED PRODUCT PICKUP SYSTEM

CROSS REFERENCE TO RELATED APPLICATIONS

This application is a continuation of International Application No.: PCT/JP2017/042217, which was filed on Nov. 24, 2017, which is based on and claims priority to Japanese Patent Application No. 2017-211953 filed on Nov. 1, 2017 and the disclosures of which are incorporated by reference.

TECHNICAL FIELD

The present invention generally relates to a product pickup system that allows pickup of a batch of articles or products, for example. In particular, it relates to a pickup system that allows smooth pickup of a batch of products purchased in a store or online.

BACKGROUND ART

Various pickup systems that allows pickup of a batch of articles or products have been provided.

For example, a product selling method has been proposed which allows a customer to more easily purchase products and allows a store to more quickly and safely sell products (Patent Literature 1).

Specifically, Patent Literature 1 discloses a product selling method implemented in a store, such as a retail store or a wholesale store, that handles a plurality of kinds of products, the method including a first step of a customer paying, at an entrance of the store, an amount of money equal to or more than an estimated sum of prices of products to be purchased in the store and receiving a dedicated terminal in exchange for the money, a second step of the customer ordering one or more products the customer wants to purchase from among the products on the shelves in the store by inputting the product data on and the quantity of the one or more products to the dedicated terminal, a third step of the customer having input the product data on all of the one or more products the customer wants to purchase confirming on the dedicated terminal that the sum of the prices of the ordered one or more products falls within the amount of money paid in advance, issuing an indication for checkout to the store from the dedicated terminal, and transmitting the input product data, a fourth step of the store receiving the indication for checkout and preparing the one or more products ordered by the customer and small change, a fifth step of the store notifying the customer via the dedicated terminal that the one or more products ordered by the customer and small change are prepared, and a sixth step of the customer receiving the notification, receiving the one or more products and small change and returning the dedicated terminal to the store.

Furthermore, a product batch delivery system has also been proposed which allows a user to more easily purchase a plurality of products in a plurality of stores and allows simpler and surer delivery of the purchased products to the user (Patent Literature 2).

Specifically, Patent literature 2 discloses a purchased product batch delivery system including: a store terminal that is an information processing terminal capable of communication over a network and has a capability of reading information recorded in a mobile recording medium carried by the customer, the store terminal being provided in each of a plurality of stores geometrically related to a particular traffic facility; a pickup site terminal that is an information processing terminal capable of communication over the network and has a capability of reading information recorded in the mobile recording medium, the pickup site terminal being provided in each purchased product pickup area, which is an arbitrary area near the particular traffic facility; a shared warehouse terminal that is an information processing terminal capable of communication over the network and is provided in a shared warehouse; and a shared management server that connects to the network and has a storage device that stores information concerning a product purchased in the store and the purchaser of the product and information concerning the delivery of the product, wherein any of the store terminals has product purchase information inputting means that reads identification information from the mobile recording medium carried by the customer when a product is purchased by the customer, and transmits the identification information as well as product information that identifies the purchased product and an identifier of the store to the shared management server, the shared management server or the shared warehouse terminal includes purchase information registration means that registers the information transmitted from the product purchase information inputting means with the storage device, and delivery instruction means that searches the purchased products registered with the storage device for any purchased product(s) yet to be delivered at regular intervals or in response to a request, and the pickup site terminal or the shared management server includes: window determination and management means that retrieves from the storage device the identification on the customer who has purchased each of the purchased product(s) when the purchased product(s) is delivered from the shared warehouse to the purchased product pickup area according to the result of the search by the delivery instruction means, determines and records a window if a window at which the customer will pick up their product(s) has not been determined and issues an instruction to store the product(s) at the window, and issues an instruction to store any product purchased by the same customer and delivered to the purchased product pickup area at the recorded window; and window information notification means that notifies the mobile recording medium carried by the customer of the determined window.

CITATION LIST

Patent Literature

Patent Literature 1: Japanese Patent Laid-Open No. 2002-342683
Patent Literature 2: Japanese Patent Laid-Open No. 2006-011755

SUMMARY OF INVENTION

Technical Problem

However, such product batch delivery is usually performed by a shop clerk or a staff member. If a congestion occurs in the store or at the pickup window, or it takes time to check the purchased products, customers have to wait until they receive the products. This means that if such conventional product batch delivery is unattended or self-service, it will have a great advantage, and there is a demand for system improvement to this end.

Furthermore, in conventional sales system or batch delivery systems, customers need to pay in advance at the entrance of the store or pay each time the customers purchase a product, and therefore the conventional systems can also be improved from the viewpoint of payment.

Solution to Problem

To solve the problems described above, a purchased product pickup system according to an embodiment of the present invention is a purchased product pickup system including a management server that communicates with a terminal of a customer and manages pickup of a purchased product by the customer in a pickup area provided in or outside a store, wherein the pickup area is provided with a management gate for managing entrance to and exit from the pickup area and a storage shelf for temporarily storing the purchased product, and the management server allocates the storage shelf for storing the purchased product when the purchased product is ordered from the terminal of the customer, and notifies the terminal of the customer of the allocated storage shelf and an entrance code for passing through the management gate of the pickup area.

Advantageous Effects of Invention

The purchased product pickup system according to the embodiment of the present invention can advantageously reduce the waiting time of a customer until the customer receives a product and is flexible and convenient from the viewpoint of payment or the like, for example.

DESCRIPTION OF EMBODIMENT

In the following, a purchased product pickup system according to an embodiment of the present invention will be described in detail with reference to the drawings.

Figure 1:
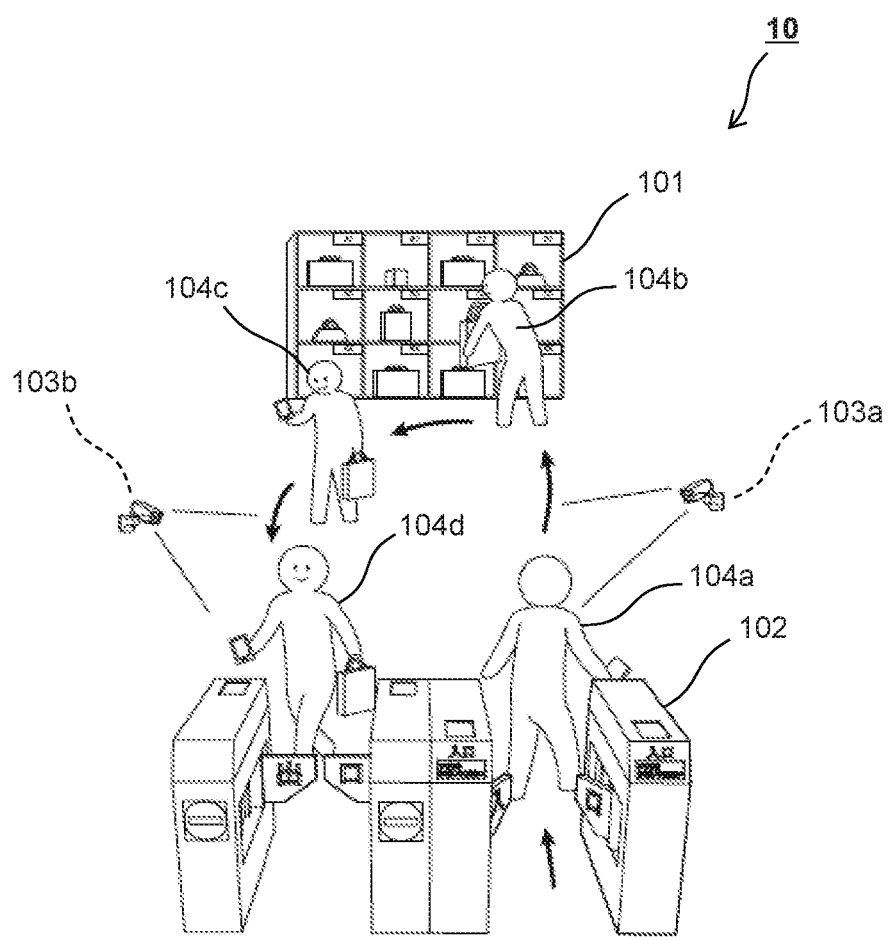
FIG. 1 is a diagram for illustrating a pickup area in a purchased product pickup system according to an embodiment of the present invention.

FIG. 1 schematically shows a pickup area in the purchased product pickup system according to one embodiment of the present invention. In this drawing, a pickup area 10 includes a pickup locker 101 installed in the area, a gate 102 through which a customer enters and exits the area, and cameras 103a and 103b installed in the area (although the system as a whole further includes a management server and other components, which will be described later).

The locker 101 is provided with a storage shelf for temporarily storing (temporarily keeping) an ordered or purchased product of a customer, and the storage shelf itself does not have to be electronically controlled. The locker 101 does not have to be connected to a network.

The gate 102 is a management gate for managing entrance and exit of customers or the like to and from the area.

The pickup area 10 may be provided as a particular area in a store or a particular area outside the store. In short, the pickup area 10 may be provided in or outside the store.

In FIG. 1, a customer 104a can enter the area 10 by holding a terminal of the customer 104a over the gate 102 at a door thereof, and picks up a purchased product or the like from a specified locker box according to an instruction displayed on a terminal screen (not shown in this drawing) (FIG. 1 shows the customer 104b picking up a purchased product from the locker 101). The customer entering the area and picking up the product is captured by the camera 103a or 103b installed in the area 10 to check the motions of the customer as required (That is, what customer is picking up which product is checked. Specifically, those motions can be recognized by an existing image recognition technique).

The customer 104c having picked up the product operates the terminal to perform a pickup completion processing (and optionally a payment processing at the same time as described in detail later) and can exit the area 10 by holding the terminal over the gate 102 at the door thereof again. As required, the customer performing the pickup completion processing and exiting the area can be captured by the camera 103a or 103b installed in the area 10 to check the motions of the customer as required.

[Sales Management]

The purchased product pickup system according to one embodiment of the present invention can also perform sales management of products or the like. The purchased product pickup system according to one embodiment of the present invention is associated with a POS terminal at the store or a mail-order (electronic commerce) system (not shown) and can manage the sales record of the store or the mail-order sales record on a customer basis. To this end, in one embodiment, the management server has the databases (D1) to (D5) described below, which can be referred to or requested for update by various terminals described later with reference to FIG. 2.

(D1) Customer Management Database

An item of data concerning a customer is registered with a customer management database. Specifically, private information on a customer, such as name, address or telephone number, or supplementary information, such as the points on a card of the customer or a pickup area frequently used by the customer, is registered.

(D2) Product Management Database

An item of data concerning a product is registered with a product management database. Specifically, a product name, a product code associated with a JAN code or the like is registered and managed.

(D3) Stock Management Database

A stock management database is used to manage the stock of products of each of sales locations (sales areas) or stores (not shown). As required, the stock management database is associated with the product management database to derive or extract a required table.

(D4) Warehouse Management Database

A warehouse management database is used to manage the stock of products stored in a warehouse at a logistics center or the like (not shown).

(D5) Sales Management Database

A sales management database is a record management database used to manage the record of sold products on a basis of sales location or store.

[Functions of Pickup Area]

In the purchased product pickup system according to one embodiment of the present invention, the pickup area serves the functions described below (the list includes system operations and operations of customers, customer terminals and the like, altogether).

(1) Management of entrance to the pickup area and exit from the pickup area (including personal identification and recording of gate passage, for example).

(2) Storage of products into boxes or onto shelves of the locker.

(3) Check of order information.

(4) Payment processing or auxiliary processing therefor (including a point return processing or the like).

(5) Monitoring of pickup of products from boxes or shelves of the locker, for example.

The functions (1) to (5) may be automatically served by the system (the terminal, the server, a logistics automation mechanism (not shown) or the like).

Figure 2:
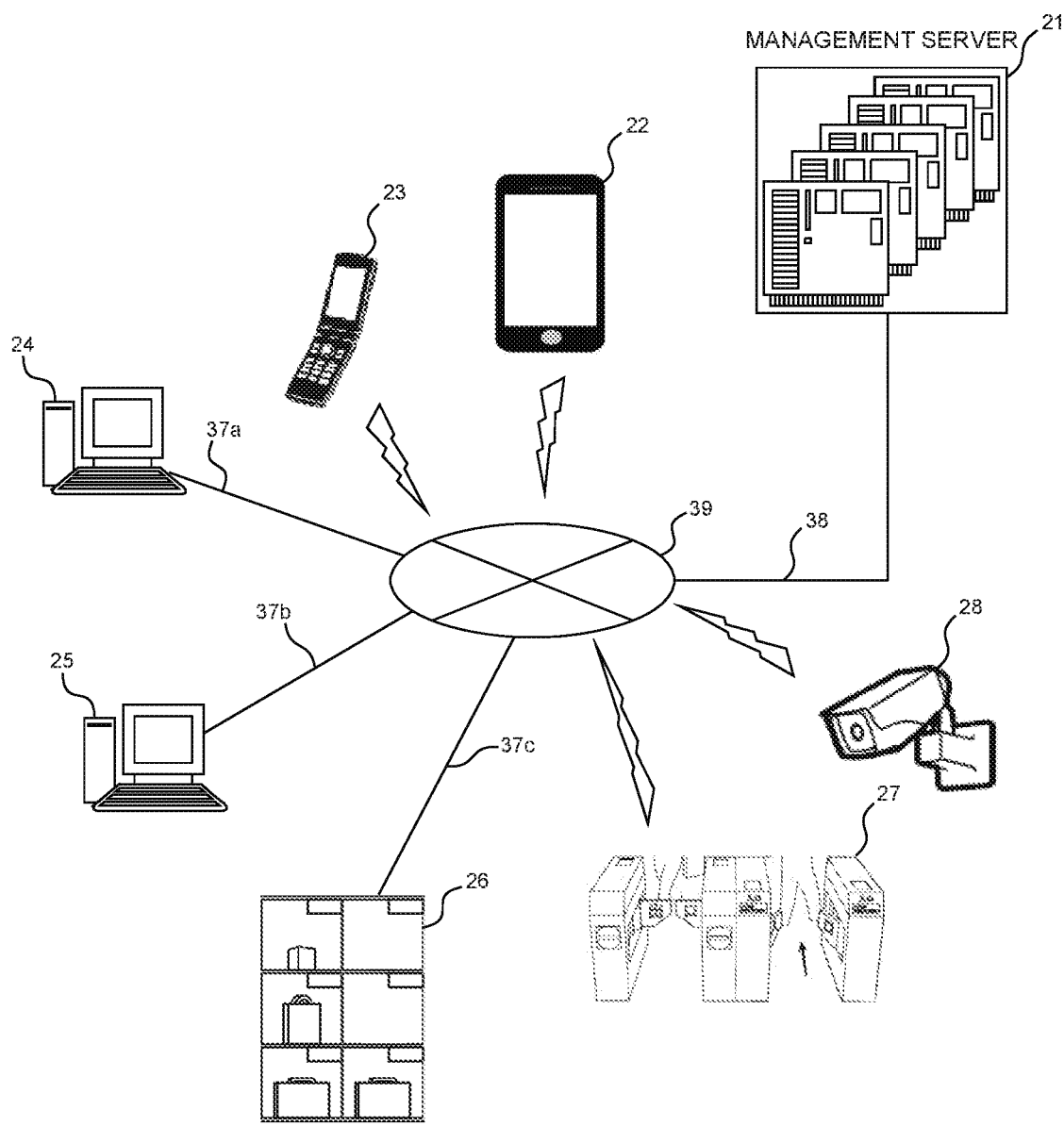
FIG. 2 is a diagram for illustrating an example of a general configuration of the purchased product pickup system according to the embodiment of the present invention.

FIG. 2 shows an example of a general configuration of the purchased product pickup system according to one embodiment of the present invention.

As shown in FIG. 2, a purchased product pickup system 20 according to one embodiment includes a management server 21 and various information processing devices used by a user (customer), a delivery person, a pickup area staff member and other persons (In the drawing, a mobile information terminal or tablet terminal 22, a cellular phone 23, and PCs 24 and 25 are shown for the sake of illustration. These information processing devises will be referred to also as "various terminals" or "terminals" hereinafter). As shown in FIG. 2, the management server 21 and the various terminals are communicatively interconnected by a dedicated line or a public line, such as the Internet (including wired lines 37a to 39). The lines can be wired or wireless. For example, the mobile information terminal or tablet terminal 22 and the cellular phone 23 wirelessly connect to the Internet 39 via a base station, access point or the like (not shown), and is further communicatively connected to the management server 21 by a line 38.

The access point described above is radio equipment that interconnects wireless terminals, such as PCs or smartphones, or connects wireless terminals to another network. Typically, the access point is a device that operates according to the communication protocols of the first layer (physical layer) and the second layer (data link layer) of the OSI reference model.

Many of the cellular phones and the mobile information terminals or tablets at the time of filing of this application have a processing power (communication rate, image processing capability or the like) comparable to that of personal computers (PCs) and therefore can be regarded as a small-size computer.

A program or software required to implement the present invention is typically installed or stored in a hard disk drive (HDD), a solid state drive (SSD) or other memory in a storage module of a PC or mobile information terminal. To execute the program or software, a part or the whole of the program or software is loaded as a software module into the memory in the storage module as required and computationally executed by a CPU.

Alternatively, a browser-based computer or mobile information terminal may be used. In that case, a program is distributed from another server or computer to the terminal as required, and the browser on the terminal executes the program.

The management server 21 can also have a basically PC-based hardware configuration (such a hardware configuration will be described later with reference to FIG. 3, just to be sure). Note that, as required, the management server 21 can include a plurality of PCs (such as several tens to several thousands of PCs) operating in parallel so that the hardware capacity of the management server 21 is improved and a vast amount of data can be processed, although the present invention is not limited to such a configuration.

Depending on the system configuration, part of the information processing terminals described above (the terminals 24 and 25 if the terminals 24 and 25 are store terminals, for example) can also perform a part or the whole of the functionality of the management server 21.

As described above with reference to FIG. 1, the purchased product pickup system 20 further includes a pickup locker 26, installed in the pickup area, a gate 27 for managing entrance and exit customers, and a camera 28 for monitoring the interior of the area. In one embodiment, as shown in FIG. 2, the locker 26 is an electronically controlled locker connected to the network by the line 37c. However, the present invention is not limited to such an implementation, and the locker 26 does not necessarily have to be connected to the network. Furthermore, the locker 26 may not be an electronically controlled locker.

Furthermore, a plurality of lockers 26, a plurality of gates 27, or a plurality of cameras 28 may be provided on one pickup area.

Figure 3:
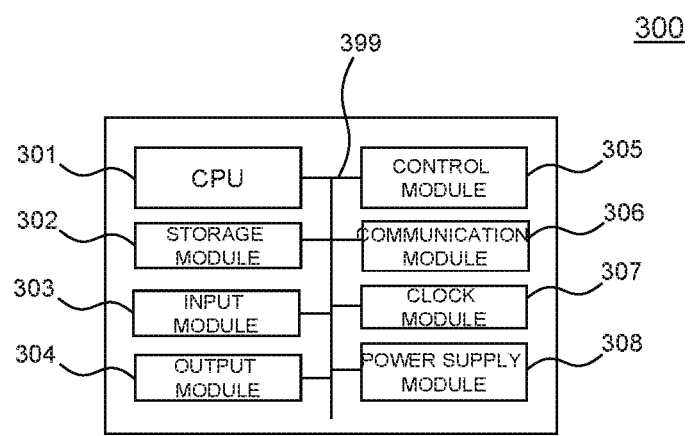
FIG. 3 is a diagram for illustrating a functional block configuration of a management server in the purchased product pickup system according to the embodiment of the present invention.

FIG. 3 is a functional block diagram showing the management server 21 in the purchased product pickup system according to one embodiment of the present invention. For example, the operation of the management server is provided by operation of each piece of hardware described below and cooperation of these pieces of hardware and software.

A management server 300, which is shown as the whole of a hardware block in FIG. 3, is generally formed by a CPU 301 that performs various comparisons and computations, a storage module 302 such as a RAM, a ROM or a flash memory, an input module 303 such as a keyboard or a pointing device, an output module 304 such as a display or a speaker, a control module 305 for various signal controls, a communication (interface) module 306 (which may be wired or wireless), a clock module 307 for measuring time or the like, and a power supply module 308.

These modules are appropriately connected to each other by a communication bus or a power supply line (collectively shown as a connection line 399 for the sake of convenience in FIG. 3, although the line 399 actually includes a plurality of different lines) as required.

A program or software required to implement the present invention executed on the management server 300 is typically installed or stored in an HDD, an SSD, a flash memory or the like forming the storage module 302. To execute the program or software, a part or the whole of the program or software is loaded as a software module into the memory in the storage module 302 as required and computationally executed by the CPU 301.

The computational execution necessarily does not have to be performed by a central processing module such as the CPU 301, and can be performed by an auxiliary computing device, such as a digital signal processor (DSP), (not shown).

Figure 4:
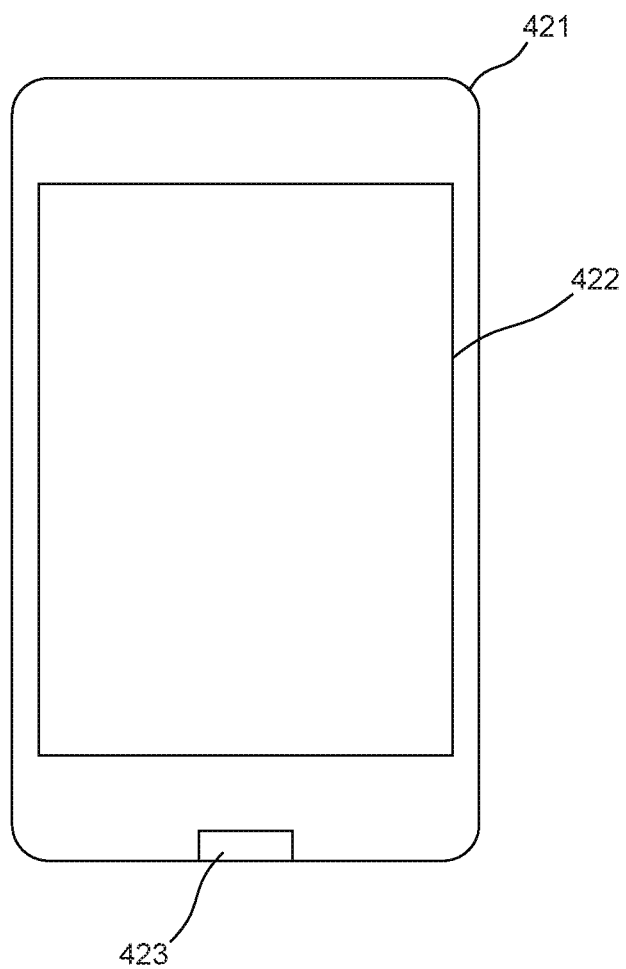
FIG. 4 is a diagram for illustrating an example of an appearance of an information processing device (user terminal) in the purchased product pickup system according to the embodiment of the present invention.

FIG. 4 shows an appearance of the tablet terminal 22 as an information processing device in the purchased product pickup system according to one embodiment of the present invention. In FIG. 4, an information processing device (tablet terminal) 42 includes a housing 421, a display 422, and a hardware button 423 provided in a central part of a lower part of the housing 421. The display 422 is typically a liquid crystal display (LCD) or the like and can display various kinds of information, such as characters or a still or moving image. The display 422 can display a menu button or software keyboard, which can be touched with a finger, a stylus (not shown) or the like to input an instruction (command) to the tablet terminal 42. Therefore, the hardware button 423 described above is not an essential component. However, the hardware button 423 is provided as a button having a particular function for the convenience of explanation of the present invention. Of course, the hardware button 423 can be replaced with a menu button displayed in an area of the display 422.

The display 422 further includes a multi-touch input panel, and coordinates of the location of touch input on the touch input panel are transmitted to the processing system (CPU) of the tablet terminal 42 via an input device interface (not shown) and processed. The multi-touch input panel is configured to be capable of sensing a plurality of points of contact with the panel at the same time. The detection (sensing) can be achieved in various manners, and not only a contact sensor but also an optical sensor can be used to detect the points of contact with the panel. As an alternative to the contact sensor and the optical sensor, an electrical capacitance pressure sensor that senses contact with a human skin can also be used.

Although not shown in FIG. 4, the tablet terminal 42 may further include a microphone or a speaker. In that case, a user's voice picked up by the microphone or the like can also be recognized and used as an input command. Although not shown in FIG. 4, the tablet terminal 42 may also be provided with a camera device, such as a CMOS, on the back face thereof or the like.

Figure 5:
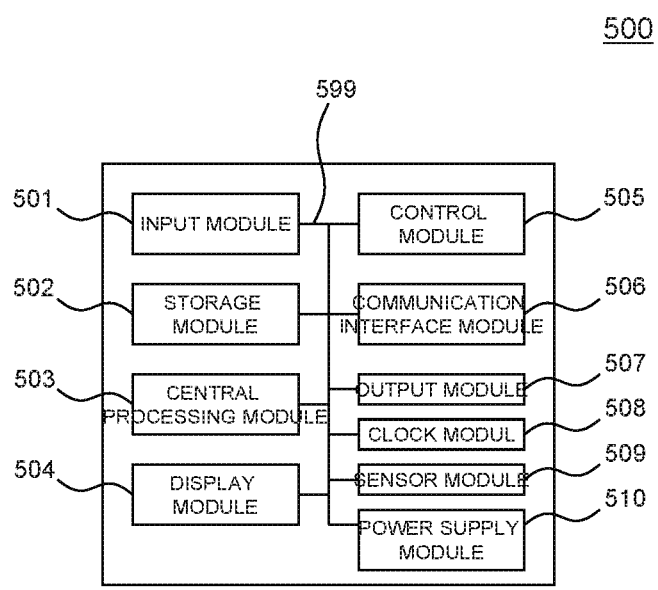
FIG. 5 is a diagram for illustrating a functional block configuration of hardware forming the information processing device according to the embodiment of the present invention.

FIG. 5 is a functional block diagram showing hardware forming the tablet terminal 42 according to one embodiment of the present invention. The operation of the tablet terminal 42 is provided by operation of each piece of hardware described below and cooperation of these pieces of hardware and software.

A tablet terminal 500, which is shown as the whole of a hardware block in FIG. 5, is generally formed by an input module 501, a storage module 502, a central processing module 503, a display module 504, a control module 505, a communication interface module 506, an output module 507, a clock module 508, a sensor module 509, and a power supply module 510. The input module 501 includes the hardware button 423 or the multi-touch input panel provided in the display 422 shown in FIG. 4 or the microphone, for example. The storage module 502 includes a hard disk, a RAM and/or a ROM for storing a program, data or the like, for example. The central processing module 503 includes a CPU that performs various numerical calculations or logical calculations according to a program. The display module 504 includes the display 422, for example. The control module 505 controls a chip or an electrical system, for example. The communication interface module 506 includes a slot for accessing the Internet, a port for optical communication, and a communication interface. The output module 507 includes a speaker, a vibrator, or an infrared projector, for example. The clock module 508 measures time, for example. The sensor module 509 includes an image sensor, such as a CMOS, an infrared sensor, or an inertial sensor, for example. The power supply module 510 supplies power to the modules in the tablet terminal 500. These modules are appropriately connected to each other by a communication bus or a power supply line (collectively shown as a connection line 599 for the sake of convenience in FIG. 5, although the line 599 actually includes a plurality of different lines) as required.

Note that the sensor module 509 may include a GPS sensor module that locates the tablet terminal 500 (22). A signal from an image sensor, such as a CMOS, an infrared sensor or other sensor forming the sensor module 509 can be processed as input information by the input module 501.

A program or software required to implement the present invention executed on the tablet terminal 500 is typically installed or stored in an HDD, an SSD, a flash memory or the like forming the storage module 502. To execute the program or software, a part or the whole of the program or software is loaded as a software module into the memory in the storage module 502 as required and computationally executed by the CPU 503.

The computational execution necessarily does not have to be performed by the central processing module 503 such as the CPU, and can be performed by an auxiliary computing device, such as a digital signal processor (DSP), (not shown).

Figure 6:
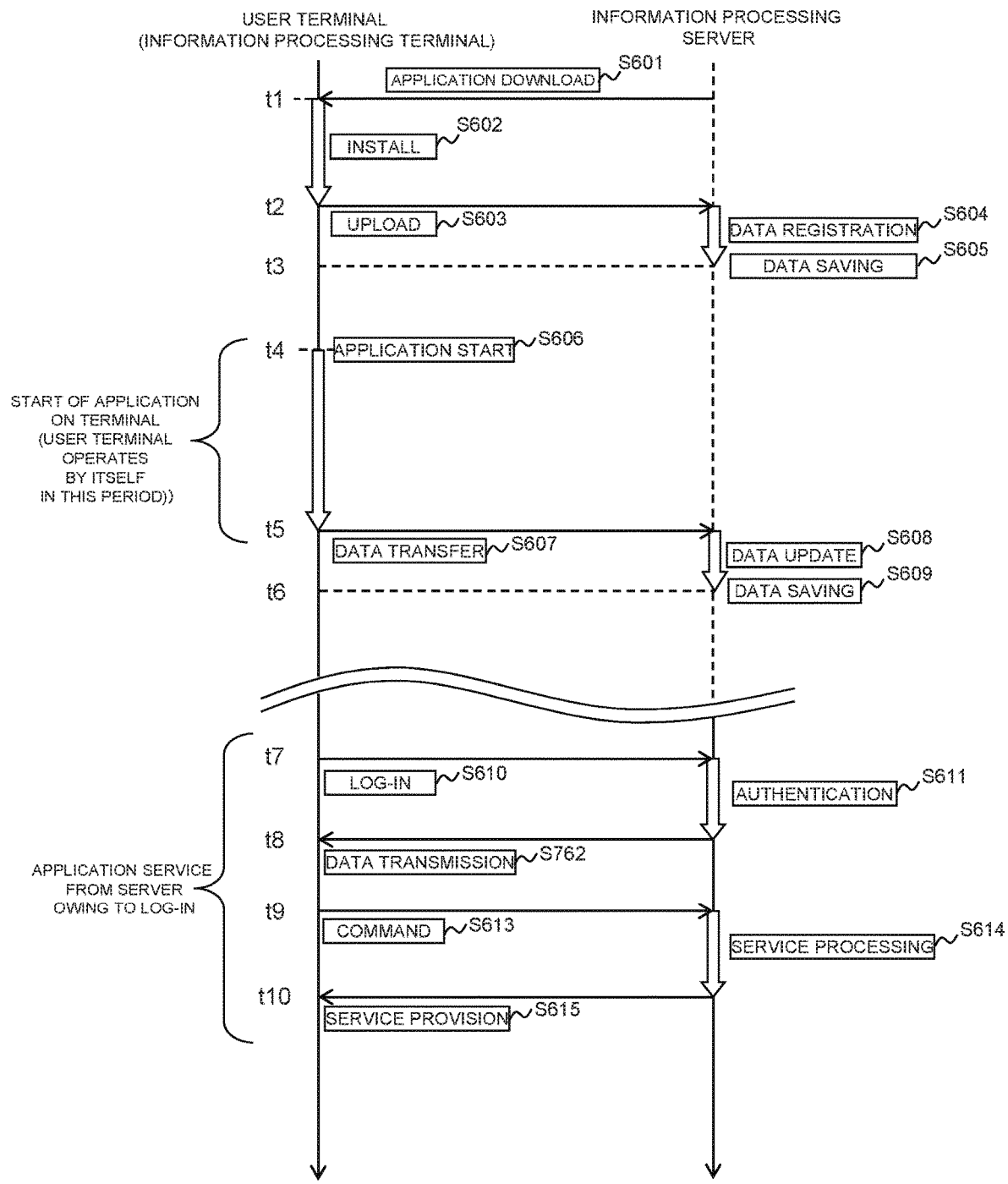
FIG. 6 is a diagram for illustrating a flow of operations or processings performed in the purchased product pickup system according to the embodiment of the present invention.

FIG. 6 shows an example of a basic operation of the system, the devices and the like according to one embodiment of the present invention illustrated in FIGS. 1 and 2.

In FIG. 6, the "user terminal" corresponds to the terminal 22 in FIG. 2, for example, and the "information processing server" corresponds to the management server 21 in FIG. 2. In FIG. 6, t1 to t10 represent a time sequence, and the operations or processes described below proceeds with time.

The operations and the points in time of processing (such as t1) in one embodiment are shown to facilitate understanding of the concept of the present invention, and the present invention is not limited to the specific time sequence illustrated in one embodiment.

At a point in time t1, the user (customer) downloads application software required to make the user terminal operate as the information processing terminal according to the present invention from the information processing server to the user terminal (Step S601). The application software is client software or application software for executing a part or the whole of the program according to the present invention. The user installs the downloaded application software in the user terminal (Step S602). At a point in time t2, the user terminal can upload the email address of the user and profile information, such as that shown in the following table as required, to the information processing server for user registration (Step S603) so that the email address and the profile information can be registered with and managed by the information processing server (Step S604).

TABLE 1

| Name (User Name) | Membership Number (ID) | Email Address (Cellular Phone Number) | Sex | Age (Age Bracket) | Place of Residence (Area etc.) |
| --- | --- | --- | --- | --- | --- |

The data items listed above are saved as user data in the storage device on the information processing server (Step S605). From a point in time t3 on, the user (customer) can operate the information processing terminal to start the application (the server can start providing service to the terminal).

Having downloaded the application and installed the application in the user terminal, the user then activates the application software at a point in time t4 (Step S606). For example, from the point in time t4 to a point in time t5, the user receives the service provided to the information processing terminal from the information processing server.

At the point in time t5, the user suspends or terminates the application software according to one embodiment of the present invention. At this point in time, if necessary, the user terminal transfers status information on the application to the information processing server (Step S607), and the server receives the status information, updates the user information on the user with the status information (Step S608), and saves the updated user information (Step S609). In FIG. 6, these processings are completed until a point in time t6.

Alternatively, after the application software according to one embodiment of the present invention is installed in the information processing terminal, at least a part of the application software may be executed on the terminal in a closed manner. In that case, the Steps S604 to S605 and S608 to S609 described above can be omitted, and any required information is saved and managed in the memory on the terminal.

In FIG. 6, points in time t7 to t10 concern an example in which at least a part of the application software according to one embodiment of the present invention is executed on the information processing server. In this case, the user (customer) performs two typical user terminal operations, that is, a log-in operation and a command transmission, and receives required data from the information processing server or receives the service provided by the information processing server.

For example, at the point in time t7 in FIG. 6, the user performs a processing of logging in to the server on the information processing terminal (Step S610), and the information processing server appropriately performs a required authentication processing (Step S611). At the point in time t8, the information processing server transmits data that allows the user to receive the service provided by the information processing server (Step S612). For example, data concerning a top menu window configured to receive a command on the terminal, or data concerning an application start window is transmitted.

At the point in time t9, the user transmits some command from the information processing terminal (Step S613). The command may be a choice of a menu displayed in the menu window or a start command to start the application displayed in the application start window. In response to receiving the command, the server starts providing service (Step S614). At the point in time t10, a service requested by the terminal is provided from the server to the terminal (Step S615).

Although not shown in FIG. 6, the terminal can transmit a command (such as a message transmission command or a menu selection command) at any time even after the point in time t10, and each time the terminal transmits a command, the server can provide service in response to receiving the command (for example, the server transfers the received message to another terminal, or analyzes the message and transmits the analysis result back to the terminal).

Figure 7:
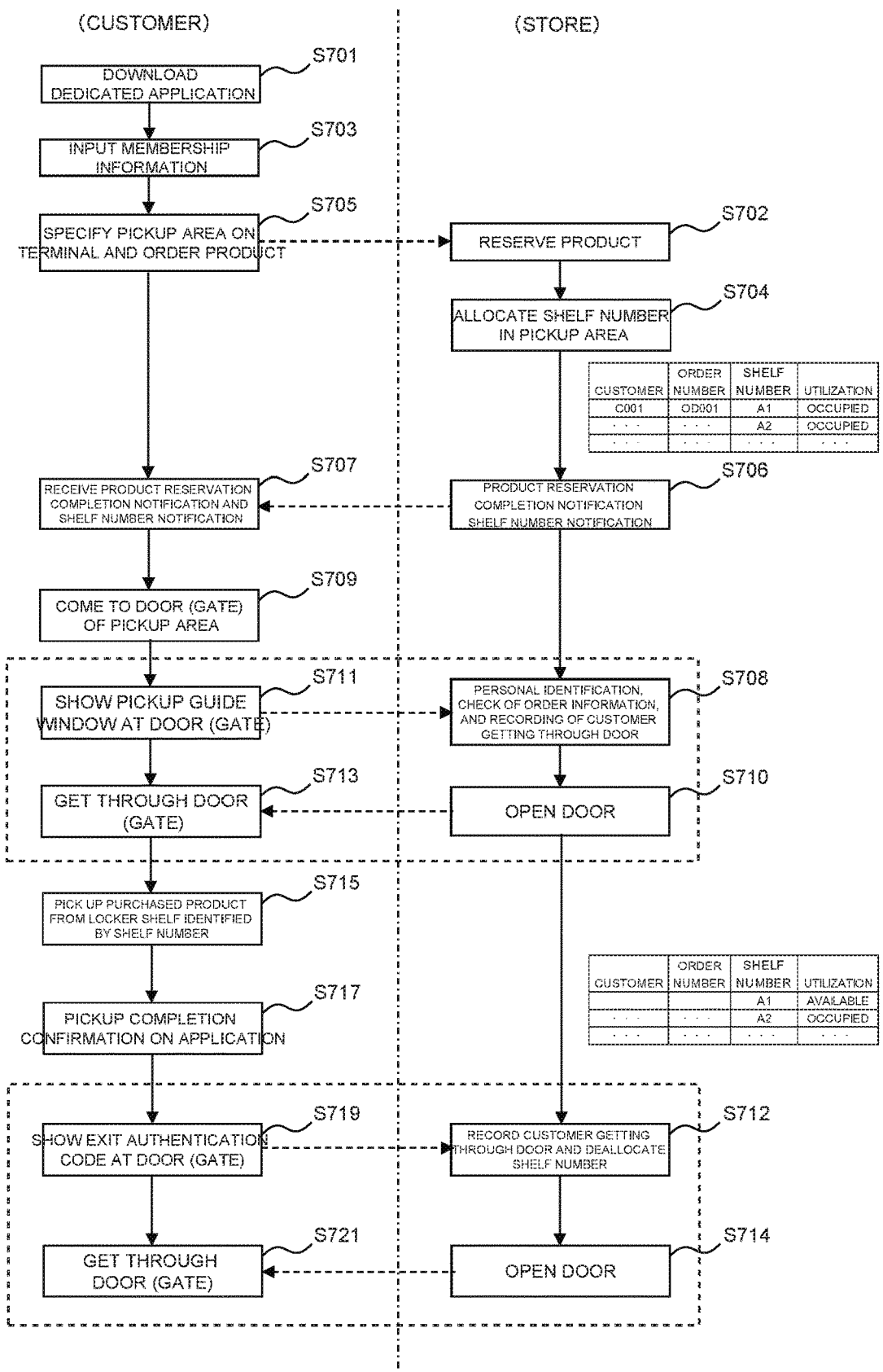
FIG. 7 is a diagram for illustrating a flow of operations or processings performed in the purchased product pickup system according to the embodiment of the present invention.

FIG. 7 shows a flow of operations or processings performed in the purchased product pickup system according to one embodiment of the present invention. The operations or processings illustrated in these drawings are generally classified into operations or processings on the side of the customer (user) who is holding the customer terminal (user terminal) and operations or processings on the side of the store, such as delivery or reserve of products or issue of various notifications or the like under the control of the management server, the terminal in the store or the like.

In Step S701, the user downloads a dedicated application to their terminal. In this regard, various scenarios are possible as described above with reference to FIG. 6, and downloading a dedicated application is not essential. In Step S703, as the first operation after start of the application, the user inputs membership information to the terminal (a specific example of this operation has been described above with reference to FIG. 6).

The process then proceeds to Step S705, in which the user uses their terminal to do shopping in the store (not shown) or to connect to a shopping server or an EC website (not shown) of the store to do online shopping. The purchase procedure in the store or the product purchase procedure on the website itself can be a known procedure. In one embodiment of the present invention, however, such a known procedure may not be used, and a payment processing can be performed at any time (as described in detail later).

In this step, as an operation specific to one embodiment of the present invention, the user can specify a "pickup area" at which the user will pick up one or more products after purchasing the product(s). The product pickup area is specified in an existing GUI window. For example, the pickup location can be selected by placing a checkmark in a pickup area selection box displayed on the user terminal screen (not shown).

In Step S702, the product which the user has purchased or indicated their intention to purchase in Step S705 is reserved, the store receives the specification of the pickup location (pickup area) for the product input in Step S705 from the user terminal, and a preparation for carrying the product into the pickup area is made (a carrying-in instruction is entered to a relevant store terminal, for example). The product may be carried in by a staff member (such as a store staff member or a pickup area staff member) of the store or automatically carried in by a robot or the like.

In Step S704, the preparation for carrying the product from the store (or the store shelf) into the pickup area is made, and a box (shelf) number of a box (shelf) in the locker in the pickup area is allocated. In one embodiment of the present invention, this allocation is automatically performed by the management server 21 and is managed in a table, such as the table shown below.

TABLE 2

| Membership Number (ID) | Order Number | Pickup Area Number | Locker Number | Shelf (Box) Number | Utilization |
| --- | --- | --- | --- | --- | --- |

In the table shown above, the membership number (ID) is a unique number assigned to the customer. The order number is linked to the product (to be) purchased, and information linked to the product, such as product code or quantity, is separately managed in another table (not shown). The pickup area number is a number that identifies the pickup location specified by the customer, the locker number is a number that identifies a locker installed in the pickup area identified by the pickup area number, and the shelf number is a number that identifies a shelf in the locker identified by the locker number.

The utilization is the current utilization of the particular shelf in the locker in the pickup area identified by the numbers described above and is managed using a flag or the like.

The product is then stored or carried into the particular shelf in the particular locker in the particular pickup area allocated as described above. This work may be performed by a store staff member or a pickup area staff member or an automation mechanism (robot) (not shown) as described above.

In Step S706, a terminal in the store notifies the customer terminal that the product has been reserved and the shelf number of the locker in the pickup area has been determined. The notification may be issued by the management server 21 or an arbitrary terminal in the store. The notification may be issued by a store staff member or may be automatically issued when the shelf number of the locker in the pickup area is determined.

Figure 8:
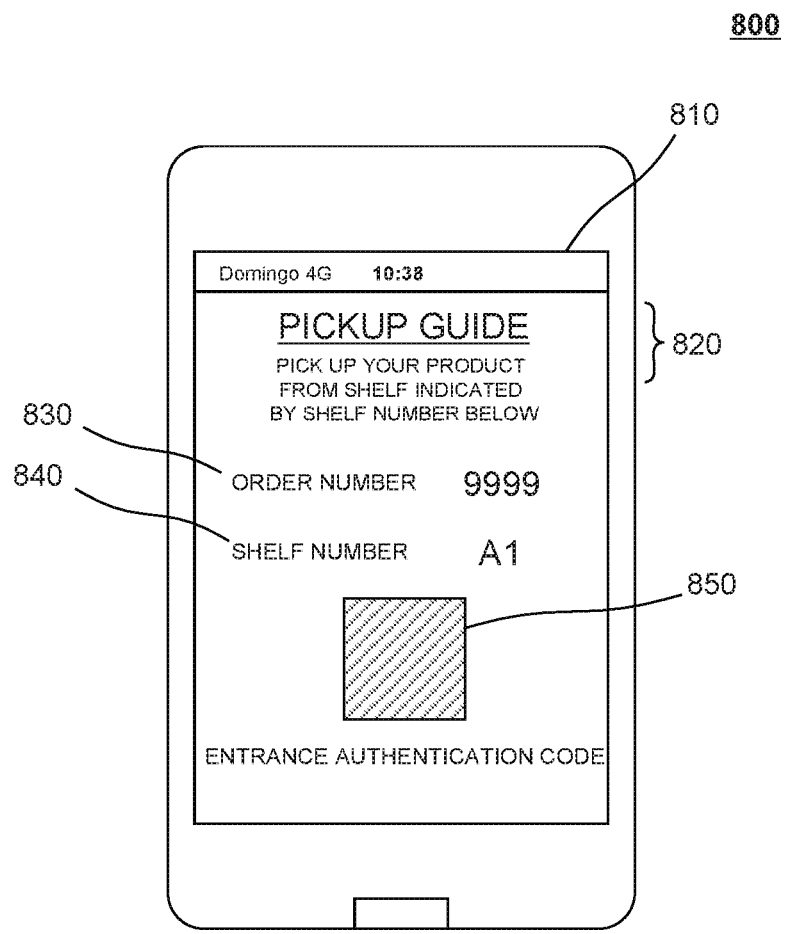
FIG. 8 is a diagram for illustrating an example of a window displayed on the information processing device (user or customer terminal) in the purchased product pickup system according to the embodiment of the present invention.

In Step S707, the customer terminal receives the notification. An example of the notification is shown in FIG. 8. FIG. 8 shows an example of a window displayed on a user terminal 800, and a product pickup guide message 820, an order number field 830, a locker shelf number field 840, and an entrance authentication code 850 are shown on a display 810 of the terminal 800.

The entrance authentication code 850 is a form of entrance code that allows the customer to pass through the gate to enter the pickup area.

Although only the shelf number "A1" is displayed in the locker shelf number field 840, if a plurality of lockers is installed in the same pickup area, the locker number of a particular locker and the shelf number of the shelf in the locker can be displayed. The entrance authentication code 850 may be a known two-dimensional code.

A button (not shown) or the like can be operated to close the window or move to another window, such as a menu window.

In Step S709, the customer having received the notification in the preceding step (Step S707) visits the pickup area to pick up the product. At least until this point in time, the product to be delivered to the customer is carried or brought into the shelf in the locker in the pickup area.

In Step S711, the customer shows the entrance authentication code in the pickup guide window (illustrated in FIG. 8) over the gate 102 at the door thereof. According to one embodiment of the present invention, the code is optically read at the gate 102 and is transmitted to the management server 21 or a terminal in the store to perform an authentication processing for the customer and a check processing for the order information (Step S708). If there is no problem, the process proceeds to Step S710, in which the door of the gate 102 (check door, for example) is opened. Then, the customer getting through the door is recorded in the management server 21 or the terminal in the store (Although this recording is shown as being performed in Step S708 in FIG. 7, the recording may be performed in Step S710).

In Step S713, the customer gets through the door of the gate 102.

In Step S715, the customer picks up the purchased product from the locker shelf (box) identified by the shelf number indicated in the notification. The customer picking up the product can be monitored with the camera 103*a* or 103*b* installed in the pickup area (in addition, a known image recognition technique can be used to allow the management server 21 or the terminal in the store to recognize who is picking up which product. This is a known technique and therefore will not be described in detail here).

Figure 9:
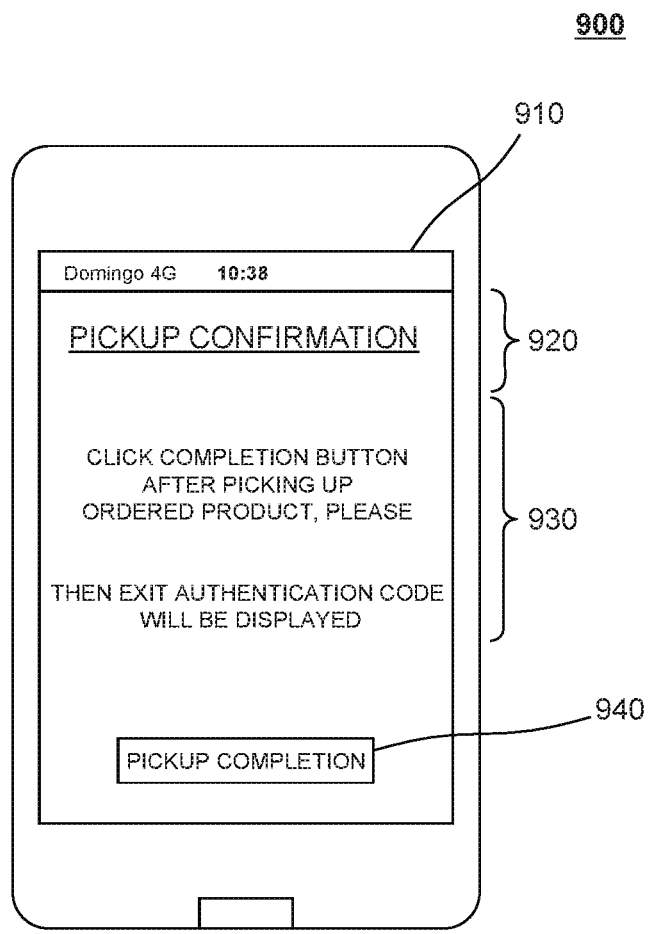
FIG. 9 is a diagram for illustrating an example of another window displayed on the information processing device (user or customer terminal) in the purchased product pickup system according to the embodiment of the present invention.

In Step S717, the customer performs a pickup completion confirmation processing on their terminal (customer terminal). An example of the confirmation processing is shown in FIG. 9. FIG. 9 shows an example of a window displayed on a user terminal 900, and a product pickup confirmation title 920, a confirmation guide message 930, and a product pickup confirmation button 940 are shown on a display 910 of the terminal 900. When the customer presses the confirmation button 940, an indication of the pressing is transmitted to the management server 21 or the terminal in the store, and the management server 21 or the terminal in the store records that the delivery of the product to the customer is completed.

Figure 10:
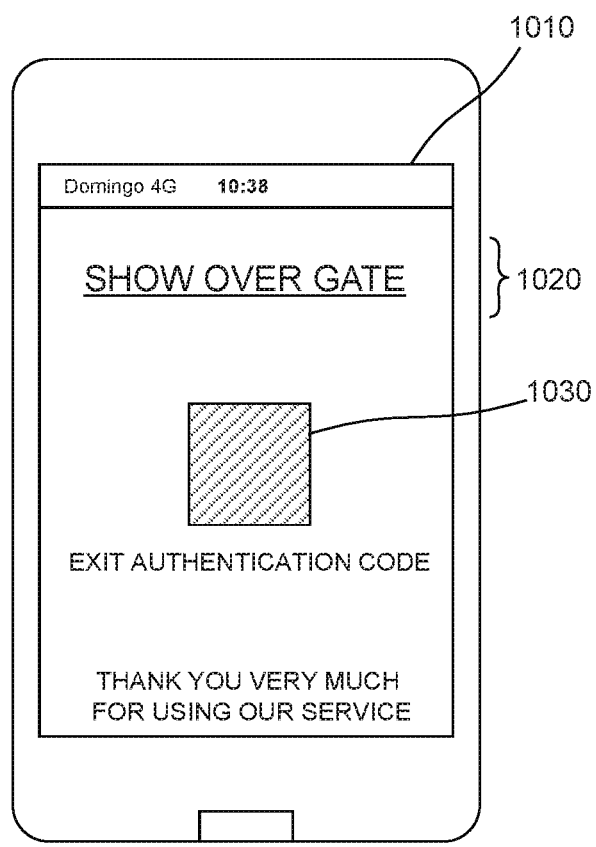
FIG. 10 is a diagram for illustrating an example of another window displayed on the information processing device (user or customer terminal) in the purchased product pickup system according to the embodiment of the present invention.

In Step S719, the customer shows an exit authentication code (a form of exit code that allows the customer to exit the pickup area) over the gate 102 at the door thereof. According to one embodiment of the present invention, the code is optically read at the gate 102 and transmitted to the management server 21 or the terminal in the store, and a deallocation processing for the shelf number of the shelf having been occupied by the product of the customer is performed (Step S712). An example of the exit authentication code displayed is shown in FIG. 10. FIG. 10 shows an example of a window displayed on a user terminal 1000, and a guide message 1020 and an exit authentication code 1030 are shown on a display 1010 of the terminal 1000. The exit authentication code 1030 may be a known two-dimensional code.

In the deallocation processing for the shelf number described above, the utilization flag for the shelf number described above with reference to the Table is reset to "not allocated" or "available". Then, the shelf becomes available for storing a product purchased by another customer.

The process then proceeds to Step S714, in which the door (check door, for example) of the gate 102 is opened. Then, the customer getting through the door is recorded in the management server 21 or the terminal in the store (Although this recording is shown as being performed in Step S712 in FIG. 7, the recording may be performed in Step S714).

In Step S721, the customer gets through the door of the gate 102.

Although the entrance authentication code and the exit authentication code have been described as being known two-dimensional codes and optically read, this is intended to facilitate understanding of the present invention, and the present invention is not limited to the implementation. For example, the codes may be magnetically read, or an authentication method based on a known near-field radio communication technology may be used.

[Timing of Payment]

With a purchased product pickup system according to a different embodiment of the present invention, a payment processing can be performed at various timings in the flow of operations or processings illustrated in FIG. 7. Examples of such timings are as follows.

(1) The timing of a product being ordered in Step S705.
(2) The timing of the customer getting through the gate door to enter the pickup area in Step S711 or S713.
(3) The timing of the customer picking up the product in Step S715.
(4) The timing of the pickup completion confirmation on the customer terminal application in Step S717.
(5) The timing of the customer getting through the gate door to exit the pickup area in Step S719 or S721.

Any of the timings (1) to (5) described above does not exclude any other of the timings. For example, if a customer has previously paid for a product at the timing (1) of the product being ordered and now wants to order an additional product on the way to the pickup area, the customer can order the additional product on the customer terminal screen (not shown) and pay for the additional product at any of the timings (2) to (5).

As another example, if a customer has previously paid for products at the timing (1) of the products being ordered and then has returned some of the products after the timing (3) of picking up the products in the pickup area, the customer can perform a settlement processing (refund processing) for the returned products at any of the timings (4) and (5).

The convenience of the present invention is further increased by the various timings payment (refund) described above.

The purchased product pickup system and the components thereof according to an embodiment has been described above with regard to specific examples. The present invention can be embodied as a method or a program for implementing a system or a device or a recording medium in which the program is recorded (such as an optical disk, a magneto-optical disk, a CD-ROM, a CD-R, a CD-RW, a magnetic tape, a hard disk or a memory card), for example.

The implementation of the program is not limited to an application program, such as an object code compiled by a compiler or a program code executed by an interpreter, and may be a program module or the like incorporated in an operating system.

Furthermore, the program does not need to be totally executed by a CPU on a control board, but a part or the whole of the program may be executed by another processing unit (such as a DSP) implemented in an expansion board or expansion unit added to the board as required.

The components described in this specification (including Claims, Abstract and the drawings) and/or the steps of the method or process disclosed in this specification can be used in any combination, as far as the features are not incompatible with each other.

Each of the features described in this specification (including Claims, Abstract and the drawings) can be replaced with a substitute feature that serves the same, compatible or similar purpose, unless explicitly described otherwise. Therefore, each of the features disclosed is only an example of a comprehensive group of same or similar features, unless explicitly described otherwise.

Furthermore, the present invention is not limited to any of the specific configurations in the embodiment described above. The present invention can be expanded to all the novel features described in this specification (including Claims, Abstract and the drawings) or all combinations thereof, or steps of all the novel methods or all the novel processes described in this specification (including Claims, Abstract and the drawings) or all combinations thereof.

REFERENCE SIGNS LIST 10 pickup area
101, 26 locker
102, 27 gate
103a, 103b, 28 camera
20 purchased product pickup system
21 management server
22 tablet terminal (a form of user terminal device and/or terminal in store)
23 cellular phone (a form of user terminal device)
24-25 PC (a form of user terminal device and/or terminal in store)
37a-37c, 38 communication line
39 public line (such as dedicated line or the Internet)

The invention claimed is:

1. A purchased product pickup system, comprising a management server that communicates with a terminal of a customer and manages pickup of a purchased product by the customer in a pickup area provided in or outside a store,
    wherein the pickup area is provided with a management gate for managing entrance to and exit from the pickup area and a storage shelf for temporarily storing the purchased product, and
    the management server:
    allocates the storage shelf for storing the purchased product when the purchased product is ordered from the terminal of the customer,
        transmits, via a communication network to the terminal of the customer, designation information of the allocated storage shelf and at least one code for passing through the management gate of the pickup area, the designation information indicating a location of the allocated storage in which the purchased product has been stored, the at least one code being displayed on the terminal of the customer and detected by a sensor on the management gate for allowing the customer to enter to and exit from the pickup area, and
        the management gate being caused to open when the at least one code is displayed on the terminal of the customer and detected by the sensor on the management gate at the time for the customer to enter to and exit from the pickup area; wherein the management server is configured to perform an image recognition processing for the purchased product and a plural of payment processing, the image recognition processing is performed by a camera to identify at least one of the customer and the purchased product stored in the storage shelf during the pick up of the purchase product by the customer, and the plural of payment processing is initiated by executing a program on and operating the terminal of the customer at one of following timings:
  (1) a timing of the purchased product being ordered;
  (2) a timing of a pickup completion confirmation processing for the purchased product on the terminal of the customer; and
  (3) a timing of the customer exiting the pickup area; wherein when the customer has previously paid for products at the timing (1) of the products being ordered and then has returned some of the products after picking up the products in the pickup area, the customer can perform a request to the management server for a refund processing for the returned products at any of the timings (2) and (3).

2. The purchased product pickup system according to claim 1, wherein the management server is a terminal on the side of the store that is provided in or outside the store.

3. The purchased product pickup system according to claim 1, wherein the management server performs an additional payment processing for an additionally purchased product.

4. The purchased product pickup system according to claim 2, wherein the management server performs an additional payment processing for an additionally purchased product.

5. The purchased product pickup system according to claim 1, wherein
  the management server is configured to perform an additional payment processing at another timing following:
  (4) a timing of the customer entering the pickup area.

6. The purchased product pickup system according to claim 1, wherein
  an additional payment processing is performed for an additionally purchased product.

7. The purchased product pickup system according to claim 1, wherein
  the at least one code includes an entrance code for opening the management gate for allowing the customer to enter to the pickup area and an exit code for opening the management gate for allowing the customer to exit from the pickup area,
  the management server transmits the designation information of the allocated storage shelf and the entrance code to the terminal of the customer for passing through the management gate for entering to the pickup area, and
  after the purchased product is picked up from the storage shelf, the management server transmits, via the communication network to the terminal customer, the exit code for passing through the management gate for exiting from the pickup area.

8. A computing method executed in a purchased product pickup system, the purchased product pickup system comprising a management server that communicates with a terminal of a customer and manages pickup of a purchased product by the customer in a pickup area provided in or outside a store, wherein the pickup area is provided with a management gate for managing entrance to and exit from the pickup area and a storage shelf for temporarily storing the purchased product, and the computing method comprises following steps executed by the management server:

a step of allocating the storage shelf for storing the purchased product when the purchased product is ordered from the terminal of the customer; and a step of transmitting, via a communication network to the terminal of the customer, designation information of the allocated storage shelf and at least one code for passing through the management gate of the pickup area, the designation information indicating a location of the allocated storage in which the purchased product has been stored, the at least one code being displayed on the terminal of the customer and detected by a sensor on the management gate for allowing the customer to enter to and exit from the pickup area, and a step of causing the management gate to open when the at least one code is displayed on the terminal of the customer and detected by the sensor on the management gate at the time for the customer to enter to and exit from the pickup area; wherein the management server is configured to perform an image recognition processing for the purchased product and a plural of payment processing, the image recognition payment processing is performed by the customer recognized by a camera to identify at least one of the customer and the purchased product stored in the storage shelf during the pick up of the purchase product by the customer, and the plural of payment processing is initiated by executing a program on and operating the terminal of the customer at one of following timings:
  (1) a timing of the purchased product being ordered;
  (2) a timing of a pickup completion confirmation processing for the purchased product on the terminal of the customer; and
  (3) a timing of the customer exiting the pickup area; wherein when the customer has previously paid for products at the timing (1) of the products being ordered and then has returned some of the products after picking up the products in the pickup area, the customer can perform a refund processing for the returned products at any of the timings (2) and (3).

9. The computing method according to claim 8, wherein the management server is a terminal on the side of the store that is provided in or outside the store.

10. The computing method according to claim 8, further comprising:
  a step of making the management server perform an additional payment processing for an additionally purchased product.

11. The computing method according to claim 9, further comprising:
  a step of making the management server perform an additional payment processing for an additionally purchased product.

12. The computing method according to claim 9, wherein the management server is configured to perform an additional payment processing at another timing following:
  (4) a timing of the customer entering the pickup area.

13. The computing method according to claim 9, wherein an additional payment processing is performed for an additionally purchased product.

14. The computing method according to claim 8, wherein
the at least one code includes an entrance code for opening the management gate for allowing the customer to enter to the pickup area and an exit code for opening the management gate for allowing the customer to exit from the pickup area,
the management server transmits the designation information of the allocated storage shelf and the entrance code to the terminal of the customer for passing through the management gate for entering to the pickup area, and
after the purchased product is picked up from the storage shelf, the management server transmits, via the communication network to the terminal customer, the exit code for passing through the management gate for exiting from the pickup area.

\* \* \* \* \*